United States Patent [19]

Will

[11] Patent Number: 4,477,940
[45] Date of Patent: Oct. 23, 1984

[54] HEAVY DUTY WIPER ARM

[75] Inventor: Terry M. Will, Valparaiso, Ind.

[73] Assignee: The Anderson Company of Indiana, Gary, Ind.

[21] Appl. No.: 524,379

[22] Filed: Aug. 18, 1983

[51] Int. Cl.³ .............................................. B60S 1/34
[52] U.S. Cl. ................................................. 15/250.35
[58] Field of Search ............. 15/250.32, 250.35, 250.2

[56] References Cited

U.S. PATENT DOCUMENTS

| 2,295,621 | 9/1942 | Zaiger . |
| 2,312,279 | 2/1943 | Zaiger . |
| 2,684,258 | 7/1954 | Krohm . |
| 2,736,053 | 2/1956 | Oishei et al. . |
| 2,804,639 | 9/1957 | Oishei . |
| 2,844,838 | 7/1958 | Krohm . |
| 3,009,186 | 11/1961 | Lenz . |
| 4,050,832 | 9/1977 | Stratton et al. . |
| 4,318,201 | 3/1982 | Rogers et al. . |

FOREIGN PATENT DOCUMENTS

| 2105775 | 10/1971 | Fed. Rep. of Germany . |
| 2356606 | 5/1975 | Fed. Rep. of Germany . |
| 1190566 | 4/1959 | France . |
| 1276133 | 10/1961 | France . |
| 636060 | 3/1962 | Italy . |

*Primary Examiner*—Peter Feldman
*Attorney, Agent, or Firm*—Wood, Dalton, Phillips, Mason & Rowe

[57] ABSTRACT

A windshield wiper arm assembly is provided and has a mounting head connected to an oscillatably driven pivot shaft. The assembly has an outer arm section pivotally connected to the head, the outer arm section being adapted to support a wiper blade. A link is pivotally supported at one end to the mounting head. A tension spring is connected at one end to the arm section. A lever is pivotally supported on the outer arm section and defines a pivot which is connected to the other end of both the link and the spring. The lever is H-shaped with a pair of spaced legs and an interconnecting support, one end of the legs being pivotally supported to the outer arm section and the other end having a pin which defines the pivot.

9 Claims, 6 Drawing Figures

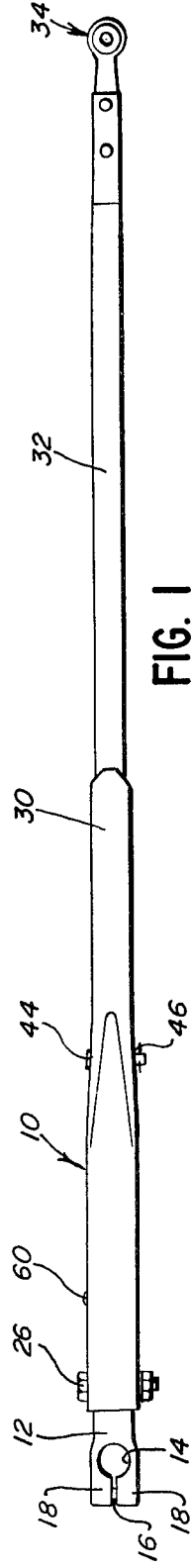
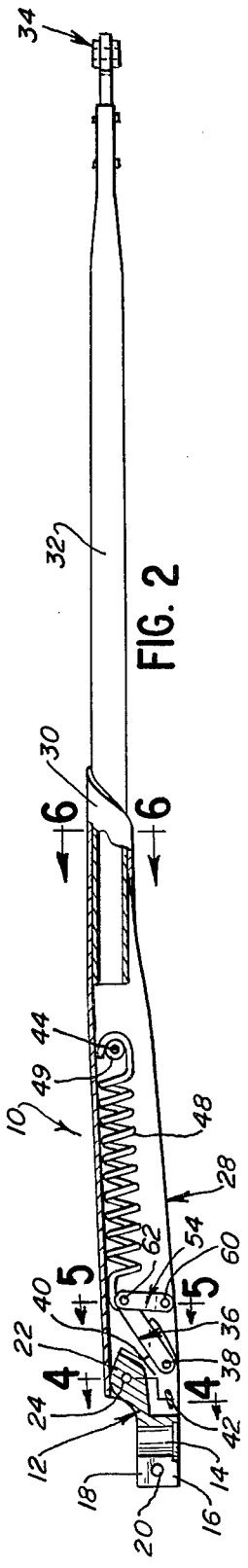
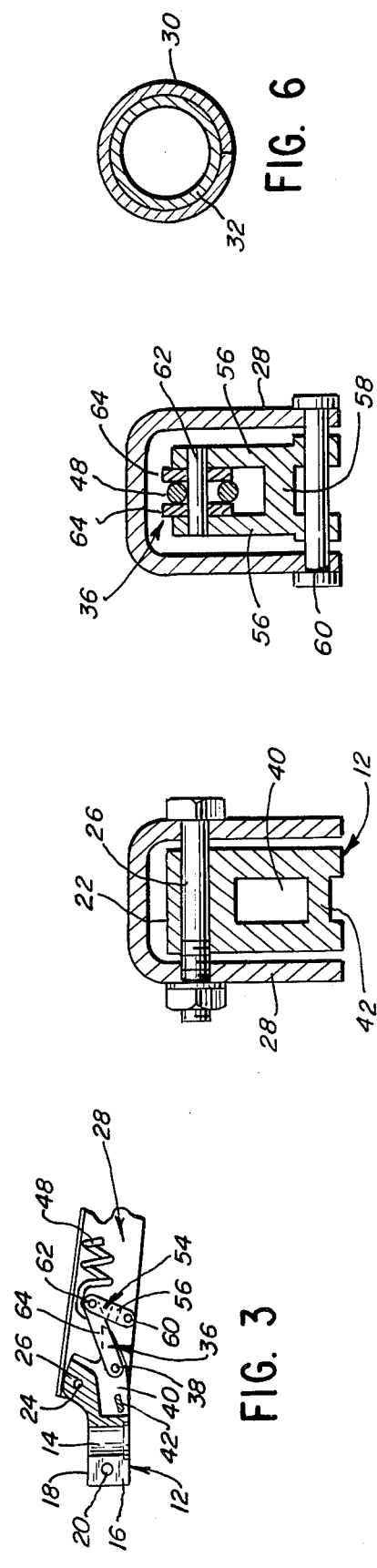

HEAVY DUTY WIPER ARM

DESCRIPTION

Background of the Invention

1. Technical Field

This invention relates generally to a windshield wiper arm assembly and more particularly to that portion of the assembly urging the arm toward the windshield.

2. Background Art

The curvature of some windshields is such that the outer end of the wiper arm supporting a wiper blade must move inwardly and outwardly several inches as the blade travels back and forth across the windshield and thus the outer arm section will pivot relative to the inner arm section or mounting head through an arc of, for example, ten degrees. This pivoting between the outer arm section and the mounting head can cause a variation in the pressure which exerts the blade against the windshield, and this lack of uniform or constant pressure is a distinct disadvantage inasmuch as it reflects on the ability of the blade to properly wipe the windshield.

Springs are generally provided in wiper arm assemblies to bias the arm toward the windshield. In order to provide a more uniform pressure of the blade on the windshield, a structure has been disclosed in U.S. Pat. No. 2,844,838 whereby a rocker is used in the arm having one point pivotally supported on the arm. The rocker defining two additional spaced pivots which are connected separately to the spring and to a link. While this structure has improved the uniformity of pressure of the blade on the windshield, an amount of variation still is present in the operation of such wiper blades. The particular disadvantage of the arm of the 2,844,838 patent is in the cost of the rocker which is generally brass or bronze and in its weight which adds to the weight of the arm and to the momentum forces generated by the weight of the arm.

The present invention is directed toward overcoming one or more of the problems as set forth above.

SUMMARY OF THE INVENTION

In one aspect of the present invention, a windshield wiper arm assembly is provided and includes an inner arm section or driving head connected to a drive shaft and an outer arm section pivotally connected to the driving head, the outer arm section being adapted to support a wiper blade. A link is pivotally supported on one end to the driving head. A tension spring is connected at one end to the outer arm section. A lever is pivotally supported on the outer arm section and defines a pivot which is connected to the other end of both the link and the spring. The lever is H-shaped having a pair of spaced apart legs which are joined by an interconnecting support. The legs of the lever are pivotally supported at one end to the outer arm section. A pin extends between the other end of the legs for defining the pivot.

With a construction of this type, a more substantially uniform and constant arm pressure is provided throughout the operating positions of the wiper, thereby causing the blade to more thoroughly and uniformly wipe the windshield. The lever is a simpler part, is cheaper to make, and is 40 to 50% lighter in weight which reduces the cost of the arm and reduces the weight of the arm thereby lowering power requirements to drive the arm. The lower weight of the arm reduces some of the problems with momentum of the arm at each end of the stroke in a wiping pattern.

BRIEF DESCRIPTION OF THE DRAWINGS

FIG. 1 is a top view of the arm assembly embodying the invention;

FIG. 2 is a longitudinal section of the arm assembly

FIG. 3 is a partial section similar to FIG. 2 but showing the arm assembly in a different position;

FIG. 4 is a section view taken along line 4—4 of FIG. 2;

FIG. 5 is a section view taken along line 5—5 of FIG. 2; and

FIG. 6 is a section view taken along line 6—6 of FIG. 2.

DESCRIPTION OF THE PREFERRED EMBODIMENT

The windshield wiper arm assembly 10 is shown in FIGS. 1 and 2. The assembly 10 includes an inner arm section or mounting head 12 having an aperture 14 for receiving the drive shaft (not shown) of the wiper arm drive system of a vehicle. A slot 16 is defined between legs 18 of the head 12 and a transverse hole 20 is provided through which a screw (not shown) or other suitable means may be extended to bias the legs 18 together and thereby frictionally grasp the drive shaft. Of course, other means of connecting the mounting head 12 to the drive shaft would be suitable.

The mounting head 12 may be made by the investment casting (lost wax) process, in contrast to the prior art where the mounting head was made from aluminum bronze in a sand-mold casting. By using the investment casting process, which gives the ability to hold tolerances much tighter, the need for drilling and reaming as was done in the prior art is drastically reduced, and thereby the cost of the head is substantially reduced. The head may be cast of stainless steel or similar materials that have desirable characteristics. Further, the all stainless steel mounting head affords the ability to position a lubricated bushing directly in the aperture 14 in the mounting head 12.

The mounting head 12 also has an upwardly and forwardly extending shoulder 22 with a transverse hole 24 therein through which a bolt 26 extends to pivotally secure a channel portion 27 of an outer arm section 28 thereto. The outer arm section 28 has the channel-shaped portion 27 which generally embraces the shoulder 22 of the head 12 at one end and at the opposite end, is formed into a tubular-shaped portion 30. A tube member 32 has one end portion received within the tubular portion of the channel and an arc weld bead is run along the seam of the tubular portion to close the seam and to weld the tubular-shaped portion 30 to the tube member 32. The seam weld replaces a braze and rivet construction as has been used in the prior art. The tube member 32 is roller swagged and squared at its outer end and has mounted thereto a bearing 34 which is adapted to receive the stud of a wiper blade (not shown).

Because of the curvature of the windshield, the outer arm section 28 can pivot about pivot bolt 26 in a plane transverse to the surface of the windshield through an angle of, for example, ten degrees with respect to the inner arm section or mounting head 12. The arm assembly 10 is accordingly mounted for biasing the outer arm section 28 toward the windshield and about the head 12 so as to press the wiper blade against the windshield at a substantially uniform pressure throughout the range of wiping motion.

To provide the uniform pressure, a link 36 is provided and has one end pivotally secured to the head 12 by a pin 38 which spans across a slot 40 in the underside of the head 12. The head 12 shown is usable with other types of arm assemblies and thus includes an integrally cast cross member 42 in the slot 40 which member may be used as a pivot in other assemblies but in the present assembly 10 simply helps maintain the rigidity of the head 12. A clevis pin 44 extends through aligned openings in the channel-shaped portion of the outer arm section 28 and is secured therein by a cotter pin 46 through its end. A bushing 49 surrounds the clevis pin 44 between the side walls of the channel-shaped member to support the walls and to receive the hook-shaped one end of a tension spring 48.

A lever 54 which is H-shaped, having a pair of spaced legs 56 and an interconnecting support 58, has the lower end portions of the legs 56 pivotally secured about a pin 60 extending between the walls of the lower region of the channel-shaped portion 27 of the outer arm section 28 so that the lever 54 pivots in the channel portion 27 about the pin 60. A link pin 62 extends between the other end portions of the legs 56 opposite the arm section pin 60. The link 36 is comprised of two spaced apart members 64,64 which, as described above are pivoted about one end to the mounting head 12 by pin 38 and are pivoted at the other end to the lever 54; by the link pin 62. The tension spring 48, which has its one end connected to clevis pin 44, has its other end hooked over the link pin 62 between the two spaced apart link members 64. As best seen in FIG. 5, with the spaced link members 64 connected to the lever pin 62 on either side of the spring 48, the biasing force of the spring 48 is centrally directed so as to not create any undesirable twisting forces in the assembly 10.

Accordingly, the tension spring 48 biases the outer arm section 28 about the bolt 26 in a clockwise direction (as shown in FIGS. 2 and 3) toward the windshield. It has been found that connecting the spring 48 to the same lever pin 60 as the link 36 helps to provide substantially uniform biasing of the wiper blade against the windshield throughout the full range of wiping motion of the blade.

Other aspects, objects and advantages of this invention will become apparent from a study of the drawings, the disclosure and the appended claims.

I claim:

1. A windshield wiper arm assembly comprising:
   a mounting head;
   an outer arm section pivotally connected to the mounting head;
   means on the outer end of the outer arm section adapted to support a wiper blade;
   lever means having one end pivotally supported on the outer arm section and having the other end defining a pivot;
   a link pivotally mounted on one end to the mounting head and pivotally connected on its other end to the pivot on said lever means; and
   a tension spring connected at one end to a midportion of the outer arm section and connected at its other end to said pivot on said lever means;
   whereby the spring biases the outer arm section about the mounting head and toward the windshield.

2. The wiper arm assembly of claim 1, wherein the lever means includes a pair of spaced apart legs with the pivot defined by a pin extending between one end of the legs.

3. The wiper arm assembly of claim 2, wherein the lever means is H-shaped with a support interconnecting the legs.

4. The wiper arm assembly of claim 1, wherein the link comprises a pair of spaced apart members engaging the pivot on the lever means on opposite sides of the tension spring.

5. The wiper arm assembly of claim 1, wherein the mounting head is made of stainless steel using an investment casting process.

6. The wiper arm assembly of claim 1, wherein the outer arm section is comprised of a channel-shaped portion and a tubular portion, one end portion of the channel-shaped portion being formed in a tube shape and encircling one end of the tubular portion, and a seam weld closing the tube of the channel-shaped portion and joining said channel-shaped portion to said tubular portion.

7. In a windshield wiper arm assembly having an outer arm section adapted to support the wiper and hinged to a mounting head which is driven for wiping action, and the assembly further having tension spring means fixed on one end to the outer arm section and a link pivotally secured on one end to the head, the improvement comprising:
   a lever pivotally secured to the outer arm section, the lever defining a single pivot connected to the other end of both the spring means and the link whereby the spring means biases the arm section about the mounting head toward a windshield.

8. The improvement of claim 7, wherein the lever includes a pair of spaced apart legs with the pivot defined by a pin between the legs.

9. The improvement of claim 8, wherein the lever is H-shaped with a support interconnecting the legs.

* * * * *